US005551667A

United States Patent [19]
Galka et al.

[11] Patent Number: 5,551,667
[45] Date of Patent: Sep. 3, 1996

[54] VARIABLE LENGTH PIVOTING AIR DUCT DOOR

[75] Inventors: Dale A. Galka, Southfield; Roy A. Adanti, Farmington Hills, both of Mich.

[73] Assignee: Ford Motor Company, Dearborn, Mich.

[21] Appl. No.: 417,363

[22] Filed: Apr. 5, 1995

[51] Int. Cl.⁶ .................... F16K 3/00; B60H 1/24
[52] U.S. Cl. .................. 251/212; 251/298; 454/69
[58] Field of Search ................ 251/212, 298; 454/69

[56] References Cited

U.S. PATENT DOCUMENTS

| 3,382,895 | 5/1968 | McCullough | 251/298 X |
| 3,717,080 | 2/1973 | Foty | 251/212 X |
| 3,880,402 | 4/1975 | Fleischer | 251/212 |
| 4,614,152 | 9/1986 | Fukasaku et al. | 98/2 |
| 5,162,020 | 11/1992 | Asano et al. | 454/156 |
| 5,263,893 | 11/1993 | Hoffman et al. | 454/69 |
| 5,354,234 | 10/1994 | Arold et al. | 454/69 |

FOREIGN PATENT DOCUMENTS 3544922  6/1987  Germany ................ 237/12.3

*Primary Examiner*—Hoang Nguyen
*Attorney, Agent, or Firm*—Roger L. May; Raymond L. Coppiellie

[57] ABSTRACT

An air duct door controls air flow through an air duct in a vehicle. The door has two panels connected together that slide relative to one another as a free end of the first panel pivots and the free end of the second panel is constrained to move in a fixed path to conserve space. The first panel has a central slot and the second panel has a stop member riding in the slot to limit extension of the door. Rails are used to effect sliding movement and to lock the panel members together.

20 Claims, 7 Drawing Sheets

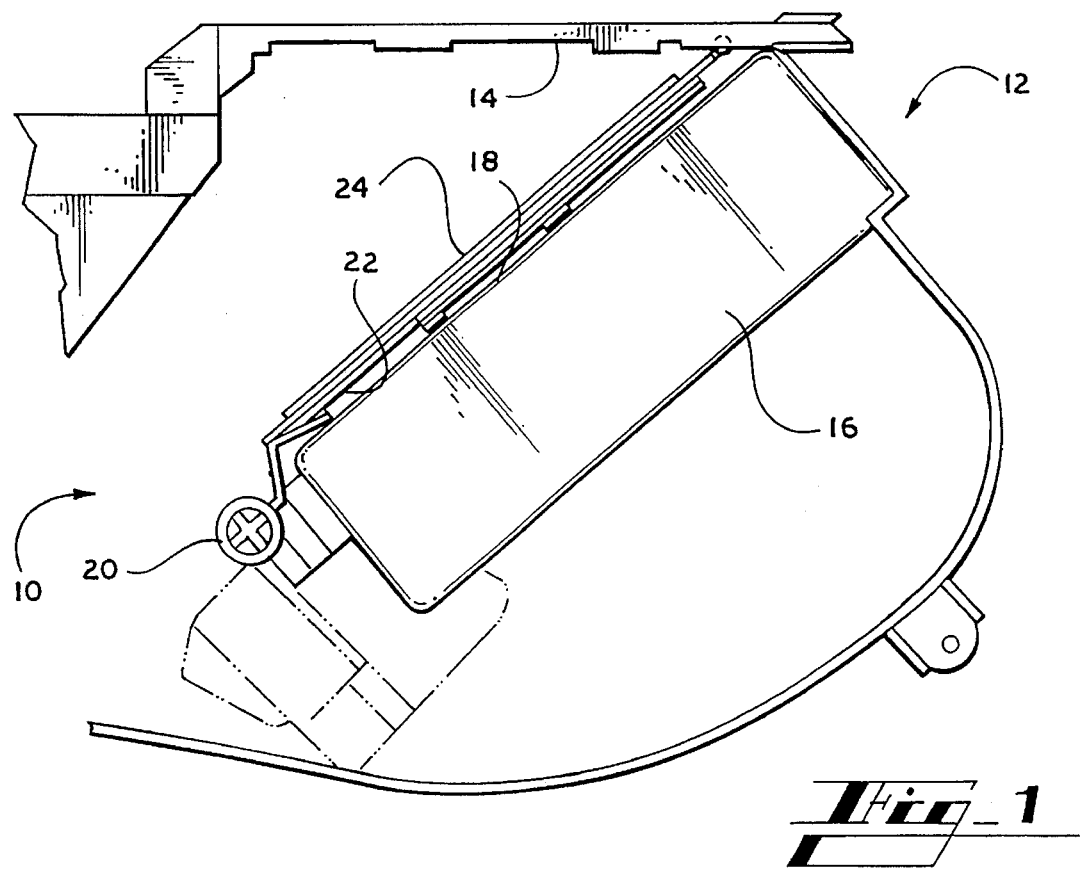
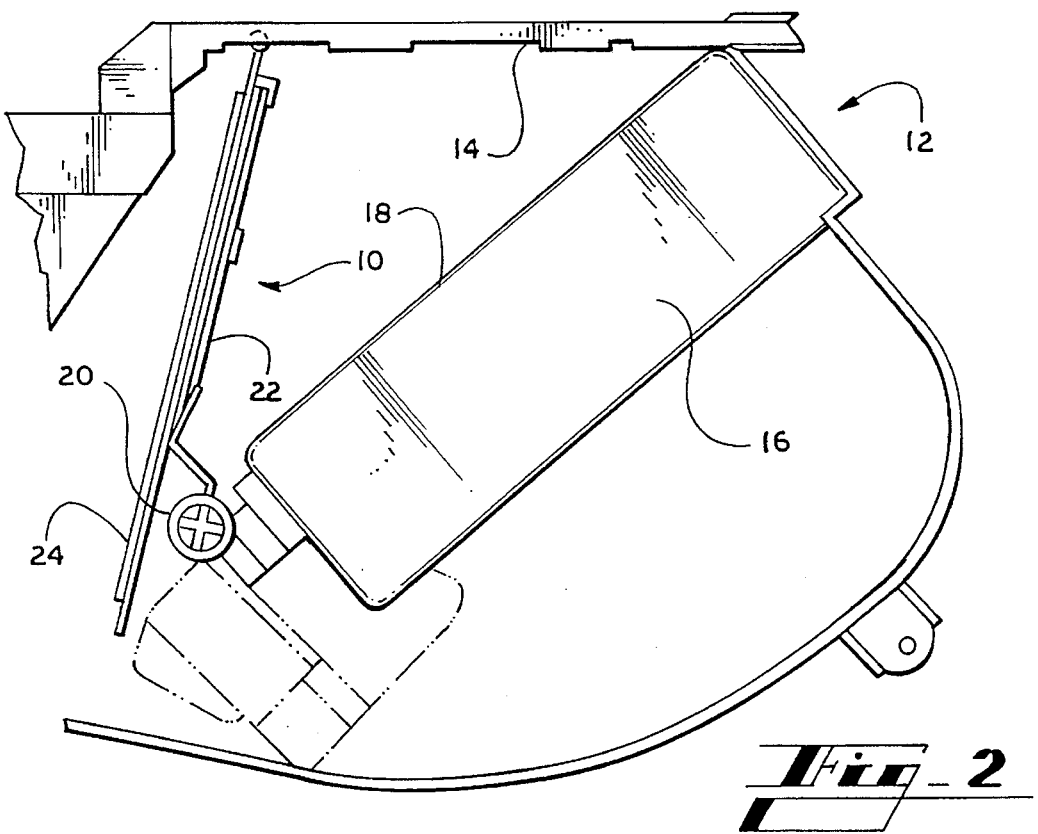

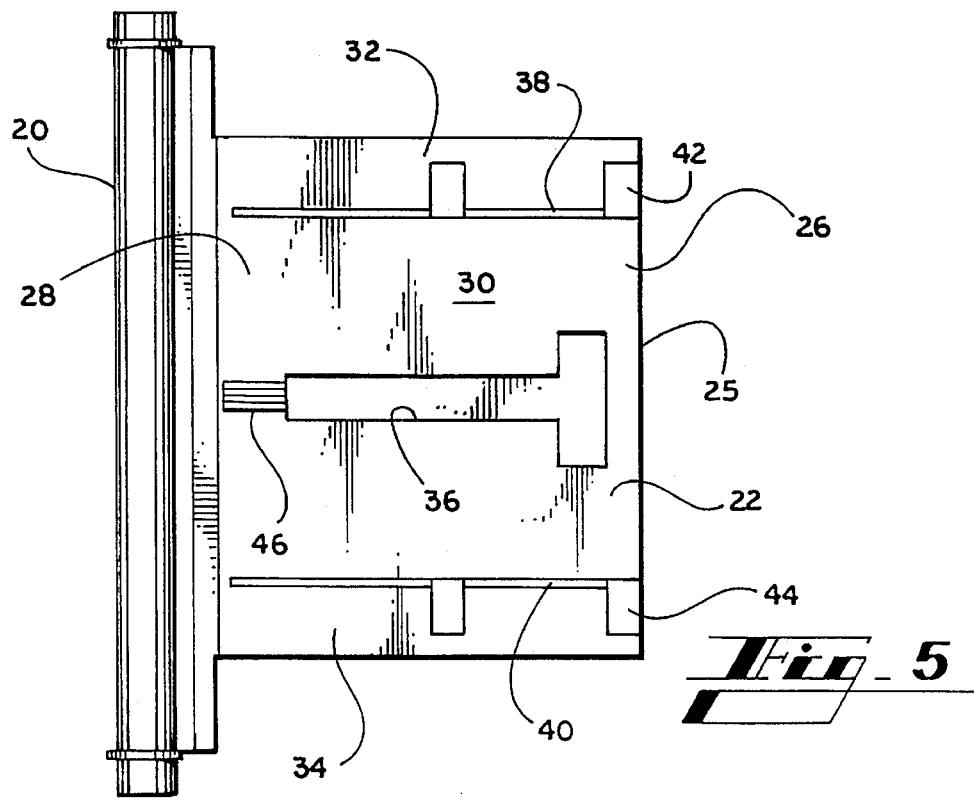
Fig_5
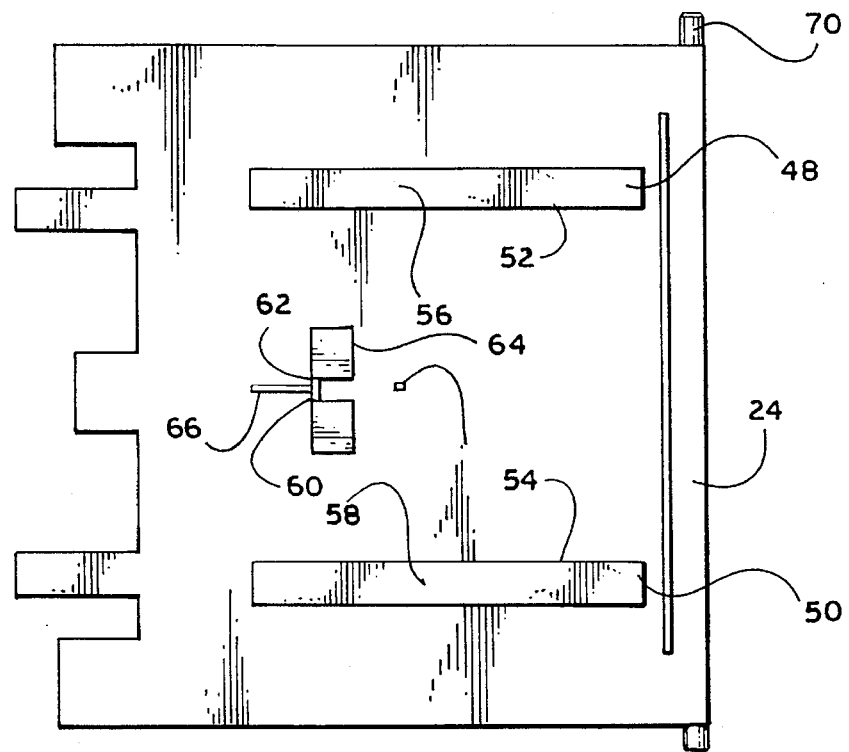
Fig_6

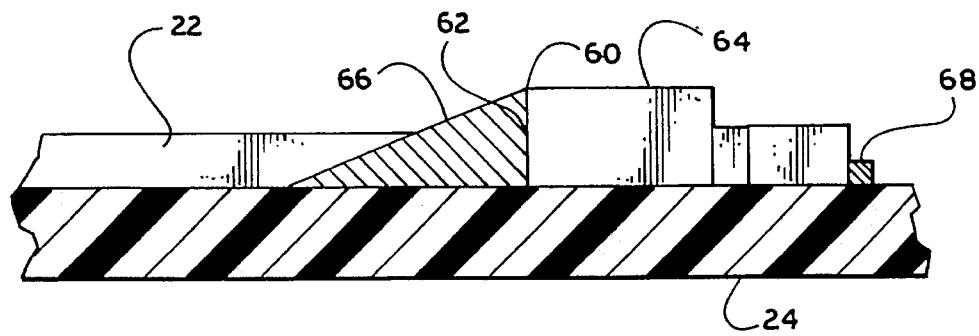
Fig_7
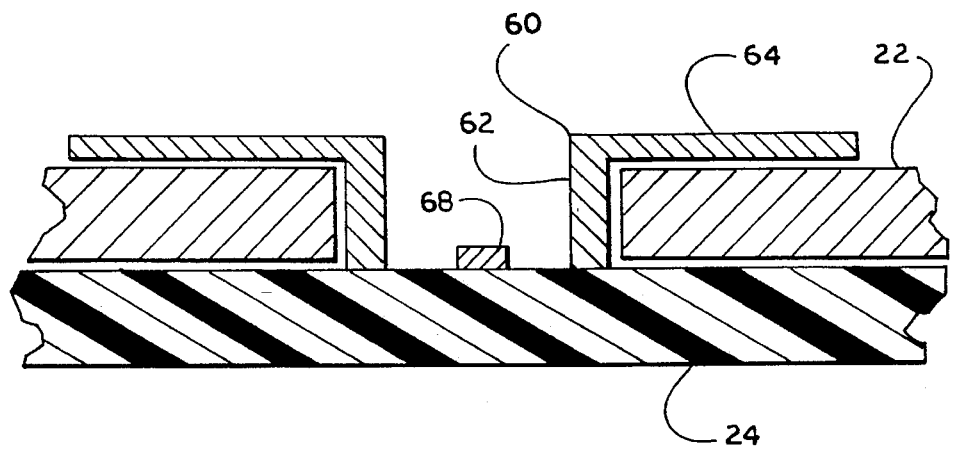
Fig_8
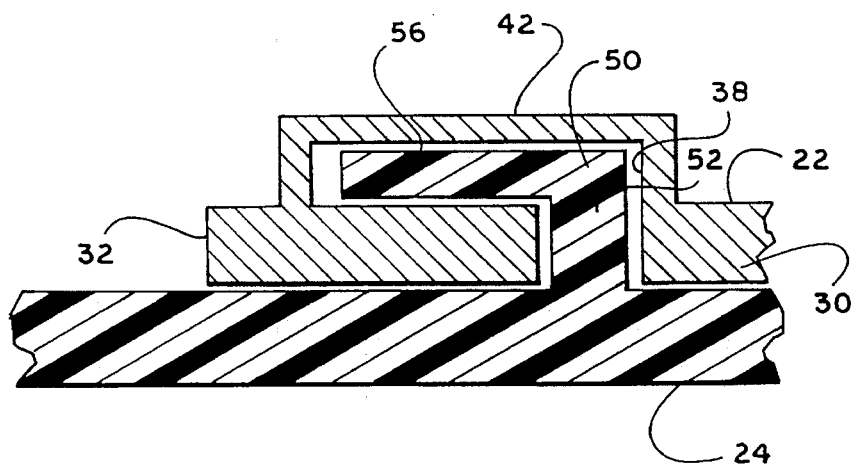
Fig_9

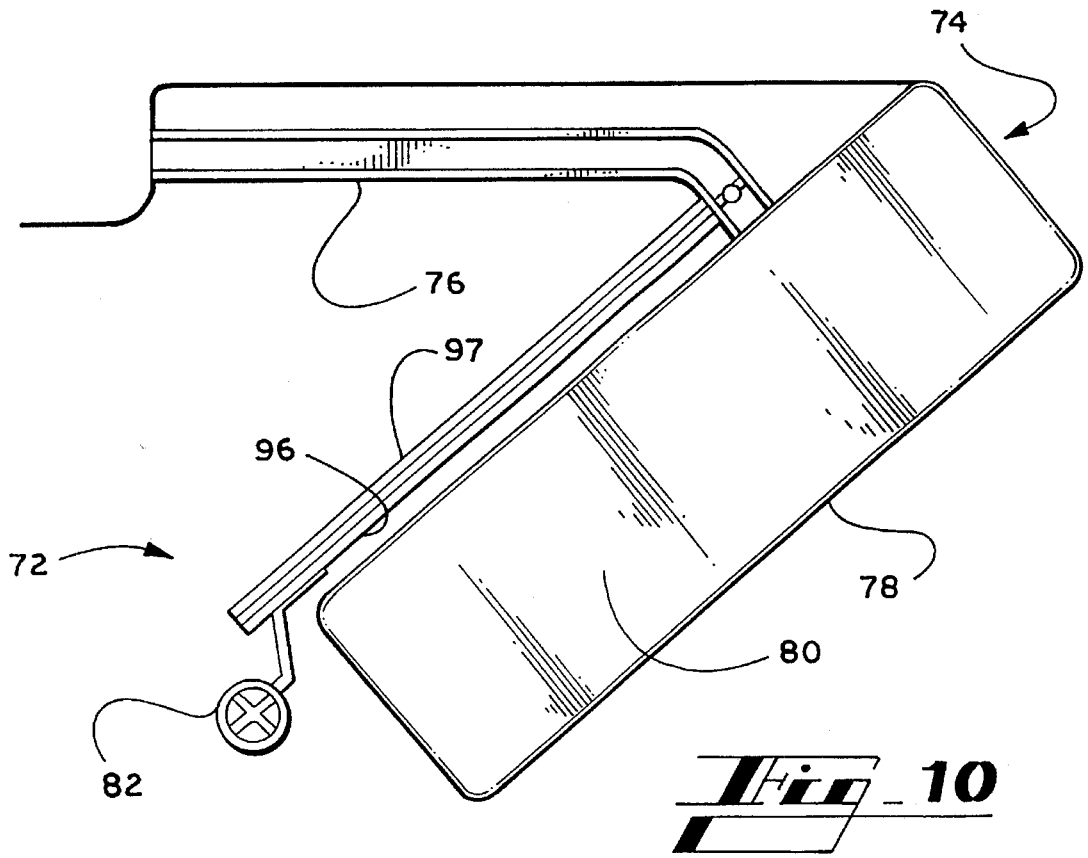
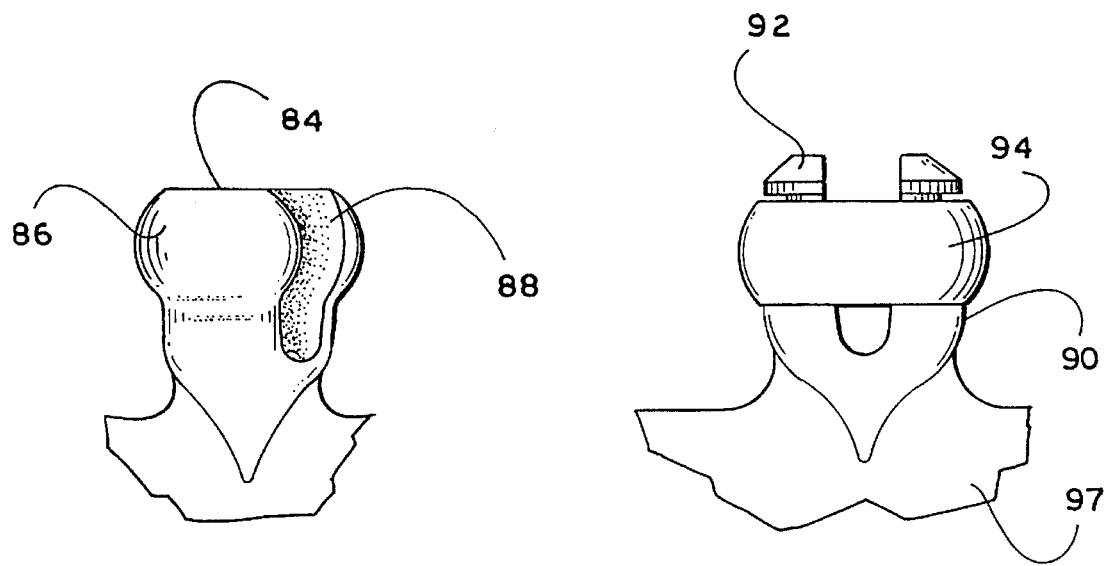

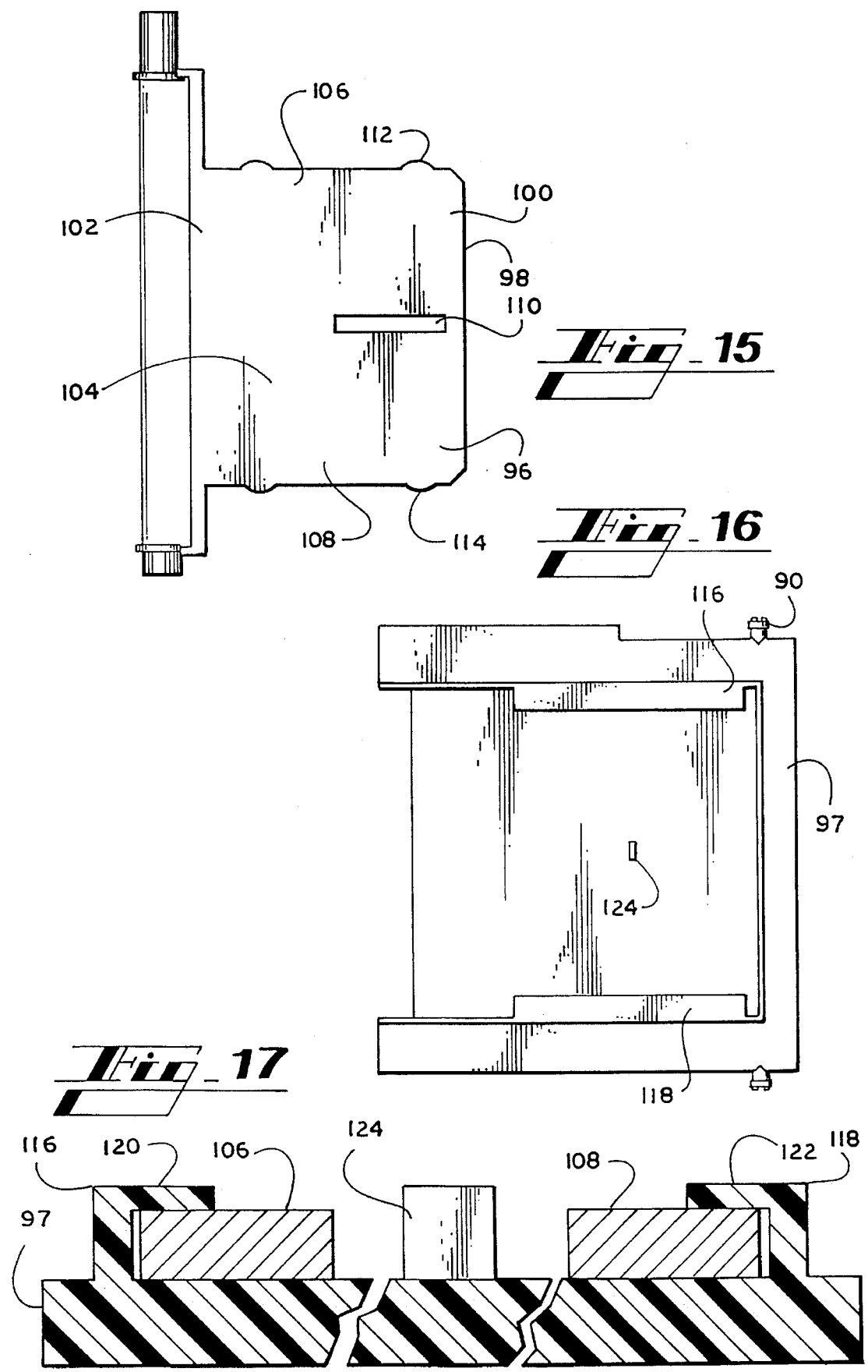

5,551,667

VARIABLE LENGTH PIVOTING AIR DUCT DOOR

FIELD OF THE INVENTION

The present invention relates generally to a vehicle ventilation system, and, more particularly, to an air duct door for controlling air flow through the air duct.

BACKGROUND OF THE INVENTION

A vehicle ventilation system, particularly for an automobile, may be called upon to provide an array of temperatures and air flows during an operating cycle. Ventilation systems are therefore equipped with controls for temperature, and air flow which may controlled by adjusting blower speed. Temperature can be regulated by controlling air flow from a heat source either at the source or a point along the duct work of the system. Ordinarily, opening and closing the mouth of a duct with a door is a simple task, but space can be a limiting factor in vehicle that prevents use of an ordinary door. A space saving door is required to reduce space required for opening and closing. In the past, space saving doors have used hinges, bellows, film belts and slider members where one member is hollow to receive another member slidably therein forming a variable length door. While these devices have worked, they required extra motors, belts and pulleys and were not always simple to manufacture. Accordingly, it will be appreciated that it would be highly desirable to have a variable length air duct door whose length changes to accomplish air flow control in the limited space available in a vehicle without employing extra belts or pulleys and which is simple to manufacture.

SUMMARY OF THE INVENTION

The present invention is directed to overcoming one or more of the problems set forth above. Briefly summarized, according to one aspect of the present invention, a two piece air duct door controls air flow through an air duct in a vehicle. A first door panel has a first end, first and second end portions, a middle portion intermediate the end portions defining a central slot extending between the end portions, and first and second side portions respectively containing first and second side protrusions extending outwardly in a direction away from the central slot. A second door panel, overlaying the first panel, has first and second rails with first and second protruding portions respectively extending from the second panel and with first and second slider portions respectively extending laterally under the first panel from the first and second protruding portions toward the central slot and slidably engaging the first and second side portions.

According to another aspect of the invention, a first door panel has a first end, first and second end portions, a middle portion intermediate the end portions defining a central slot extending between the end portions, and first and second side portions respectively defining first and second side slots extending from the first end to the second end portion parallel to the central slot and positioned one side slot on each side of the central slot separating the side portions and the middle portion. A second door panel, overlaying the first panel, has first and second rails with protruding portions respectively extending through the first and second side slots and with slider portions respectively slidably engaging the first and second side portions, and has a slide with a body and wings. The body rides in the central slot with the wings extending below the first panel laterally under the first panel beyond the central slot toward the rails locking the panels together but with the panels slidably movable one relative to the other.

The panels are slidably movable one relative to the other to vary the length of the door as the door moves between open and closed positions to control air flow through the air duct. Having the door pivot with one end riding in a track to traverse a fixed path conserves space and is accomplished by having the panel members slide relative to one another to vary door length as the door moves between the open and closed positions in response to ventilation demands.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is a diagrammatic cross-sectional view of a preferred embodiment of an air duct of a vehicle ventilation system incorporating a pivoting variable length door according to the present invention with the door closed.

FIG. 2 is a cross-sectional view similar to FIG. 1 but showing the door open.

FIG. 5 is a bottom view of the pivoting panel of the door.

FIG. 6 is a bottom view of the constrained panel of the door.

FIG. 7 sectional view taken along line 7—7 of FIG. 3.

FIG. 8 sectional view taken along line 8—8 of FIG. 4.

FIG. 9 sectional view taken along line 9—9 of FIG. 4.

FIG. 10 is a diagrammatic cross-sectional view similar to FIG. 1, but illustrating another preferred embodiment.

FIG. 11 is a somewhat enlarged view of a rail guide for use with the constrained panel of the door of FIGS. 1, 2 or 10.

FIG. 12 is a somewhat enlarged view of a rail guide similar to FIG. 11, but illustrating another preferred embodiment.

FIG. 15 is a bottom view of the pivoting panel of the door of FIG. 10.

FIG. 16 is a bottom view of the constrained panel of the door of FIG. 10.

FIG. 17 sectional view taken along line 17—17 of FIG. 13.

DETAILED DESCRIPTION OF THE PREFERRED EMBODIMENTS

Figure 3:
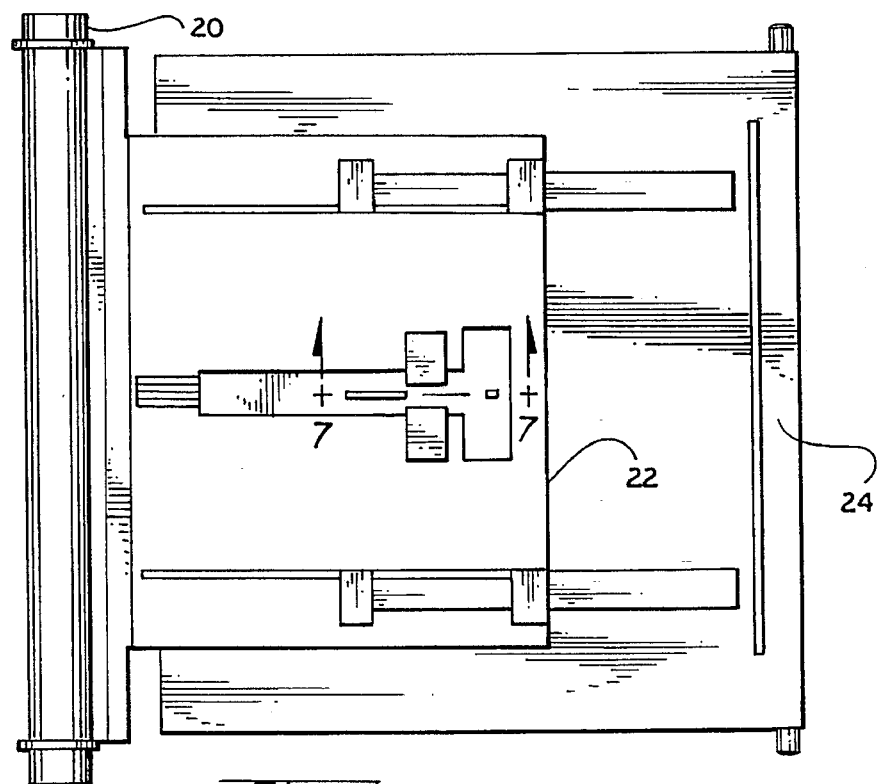
FIG. 3 is a bottom view of the door closed as in FIG. 1 showing door length extension.
Figure 4:
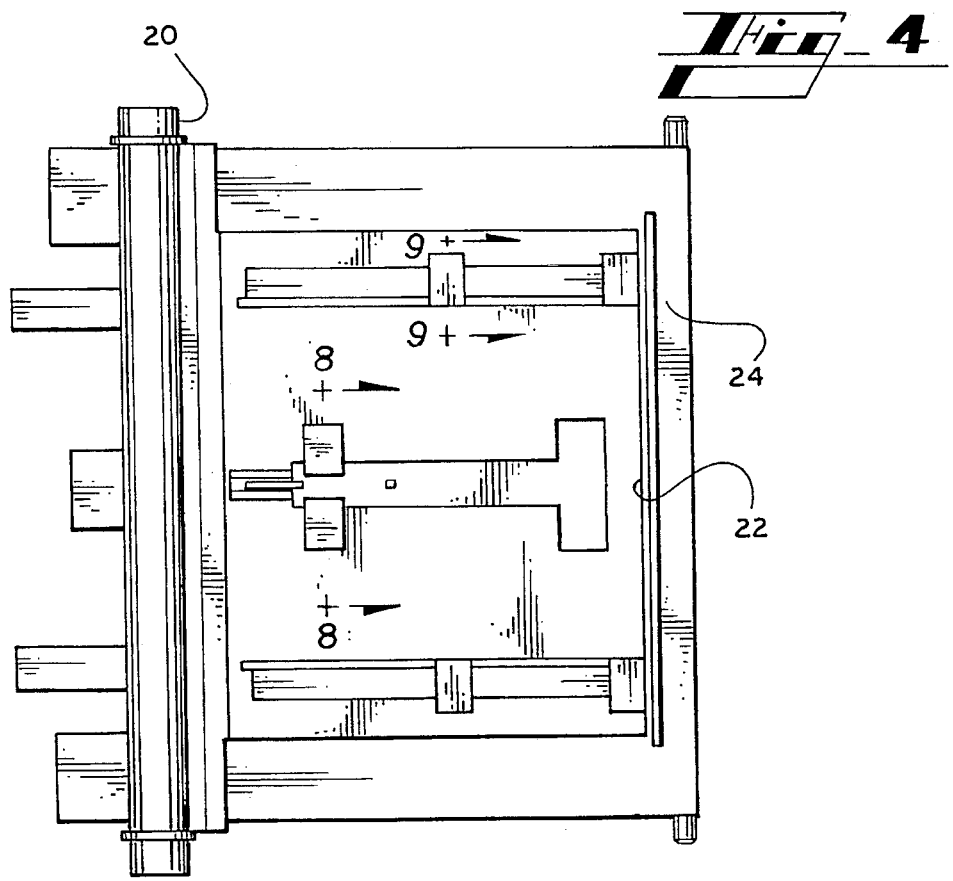
FIG. 4 is a bottom view of the door open as in FIG. 2 showing door length retraction.

Referring to FIGS. 1–4, an air duct door 10 controls air flow in a vehicle 12 wherein the vehicle 12 has a guide rail 14 and an air duct 16 with a duct opening 18. The door 10 controls the air flow through the air duct 16. Door 10 is movable between a closed position (FIG. 1) at which the door 10 restricts or completely blocks air flow to the duct 16 and an open position (FIG.2) at which the door 10 directs air flow through duct opening 18 into the duct 16 to varying degrees. As viewed in FIGS. 1 and 2, the bottom portion of the door is pivoted by a pivoting means 20, such as an electric motor, thumb wheel or other control. The top portion of the door 10 rides in a guide rail 14 that constrains movement of the top portion of the door to the shape of the guide rail, which, as illustrated, is a straight line. To accomplish both pivotal movement of the lower portion of the door 10 and straight line movement of the upper portion of the door 10, the length of the door must change. Door length change is accomplished by having the door comprised of two slidably engaging panel members 22, 24. The door panels 22, 24 may be metal or may be constructed of an easily molded resinous material with low friction to facilitate sliding contact between surfaces of the panels. Ideally, each panel is formed or molded in a single process to yield a panel with integrally formed members; however, the various components of the panel may be formed in different steps and joined together forming unitary structures. Also, sliding contact may be improved by creating bearing surfaces, using a dry lubricant or otherwise achieving low friction sliding surfaces between the panels which may be plastic, metal or combinations of such materials.

Referring to FIG. 5, the first panel 22 has a first end 25, first and second end portions 26, 28, a middle portion 30 intermediate the end portions 26, 28, and first and second side portions 32, 34. The first end 25 forms an end face on the first end portion 26 and represents the end of the panel farthest removed from the middle and second end portions 30, 28 of the first panel 22. The middle portion 30 defines a central slot 36 that extends between the first and second end portions 26, 28 and is a longitudinal slot oriented perpendicular to the first end 25 and parallel to the side portions 32, 34. The side portions define first and second slots 38, 40 that extend parallel to the central slot 36 with a side slot positioned on each side of the central slot to separate the side portions from the middle portion 30. Each side slot extends from the first end 25 to the second end portion 28 yielding a slot open on one end in contrast to the closed central slot 36.

Referring to FIGS. 5 and 9, a bracket 42 extending across the open ended slot 38 at the first end 25 connects the first side portion 32 to the middle portion 30 to thereby provide structural integrity to the first panel at the first end of the first panel. The bracket 42 is spaced from the edge of the slot 38 adjacent the first side portion 32, and, except at its point of connection, is also spaced from the first side portion. By this construction, space is provided for sliding engagement with the second panel. Similarly, there is a second bracket 44 attached to the second side portion 34 and middle portion 30. In addition, there may be additional brackets spaced along the side slots.

The central slot 36 is preferably a T-shaped slot wherein the cross member of the T is formed in the first end portion 26 providing an entryway for protruding portions of the second panel 24. Central slot 36 may also have a tapered first end portion 46.

Referring to FIGS. 6–9, the second panel 24 has first and second rails 48, 50 with protruding portions 52, 54 respectively extending through the first and second side slots 38, 40 with slider portions 56, 58 respectively slidably engaging the first and second side portions 32, 34. The rails 48, 50 have their slider portions 56, 58 extending laterally away from the central slot 36 beneath the side portions 32, 34 to cooperate with the side portions 32, 34 to connect the panels for sliding engagement. Each rail is preferably L-shaped with the short leg of the L being the protruding portion 52 or 54, and the long leg of the L being the slider portion 56 or 58 to form a slot between the long leg of the L and the underside of the second panel into which a side portion 32 or 34 of the first panel will fit to achieve sliding engagement and join the two panels.

A slide 60 completes the union of the first and second panels 22, 24. Slide 60 has a body 62 with wings 64 and a blade 66. Slide body 62 rides in the central slot 36 with wings 64 extending below the first panel 22 laterally under the first panel beyond the central slot toward the first and second rails 48, 50 locking the panels together. The body 62 has a general inverted U cross section that, preferably, substantially fills the central slot 36 so that there is minimal air flow through the central slot when the door is closed. Attached to the end of the slide body nearest the second end of the central slot is blade 66 which is preferably triangular and mateable with the second end portion of the central slot. The second end portion of the central slot and blade 66 may be tapered to provide a snug fit to prevent rattling.

The second panel 24 also includes a stop member 68 that rides in the central slot 36 and engages a first end of the central slot 36 to prevent varying the length of the door beyond a predetermined extended length. Stop member 68, cooperating with central slot 36, determines the maximum extended length of the door. The top portion of the door has rail guides 70 that ride in guide rail 14 so that the rail constrains movement of the top portion of the door to the shape of the guide rail. The guide may be constrained in the guide rail 14 in a number of ways, such as by configuring the guide 70 with a large head that does not fall through the slot provided for it in the guide rail simulating a ball and socket joint, for example (see FIGS. 11–12).

The first and second panels are assembled by aligning the first and second rails with their respective first and second side slots at the first end of the first panel. The second panel is pushed toward the first panel so that the protruding portions of the rails slide into the side slots. Next, the triangular shaped blade forces its way between the panels by operating on the middle part of the first end of the first panel forcing the first panel away from the second panel. As the second panel pushes forward, the triangular blade forces opens a passageway for the wings. Continued pushing causes the stop member to enter into the forced passageway between the two panels. More pushing causes the wings to find the entryway provided by the cross member of the central slot so that the first panel snaps back toward the second panel as the wings pop below the lower surface of the first panel. At this point, the panels are not in abutting contact but are kept from abutting by the stop member which is still between the panels. Slightly more pushing causes the stop member to find the passageway provided by the cross member of the central slot and the first panel snaps back into position abutting the second panel. As viewed in FIGS. 1 and 2, the wings prevent the panels from being separated horizontally and the stop member prevents the wings from being separated vertically. Also, the rails of the second member engage the side portions of the first member further preventing horizontal separation.

As the door moves from the closed, full cool, position (FIG. 1) to the open, full heat, position (FIG. 2), the pivoting means pivots the first end portion of the first panel causing the first end portion of the second panel to pivot with the first panel. Because the guide rail constrains the second end of the second panel to travel in a fixed path, in this instance a straight line, the pivoting motion requires relative movement between the first and second panels. This relative movement is a sliding motion wherein the side rails slide along the side portions of the first panel and the wings slide along the middle portion adjacent the central slot.

Figure 13:
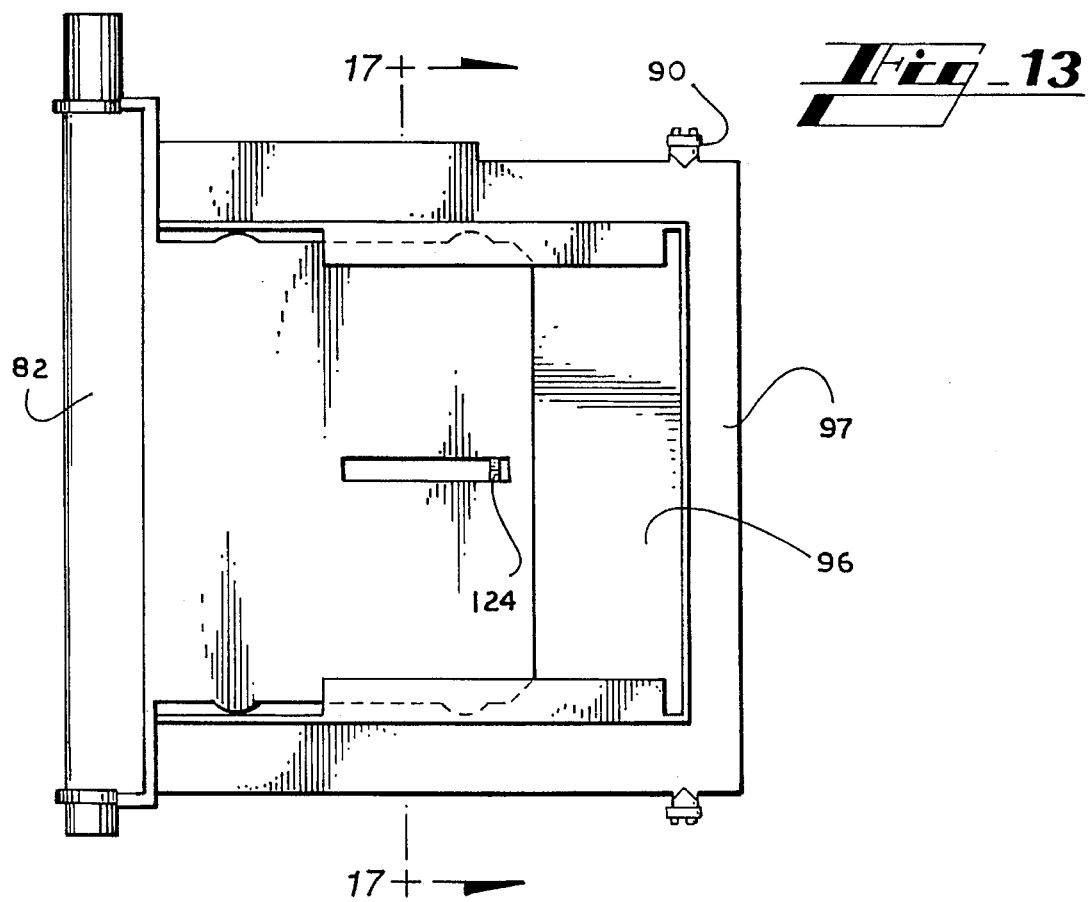
FIG. 13 is a bottom view of the door of FIG. 10 closed showing door length extension.
Figure 14:
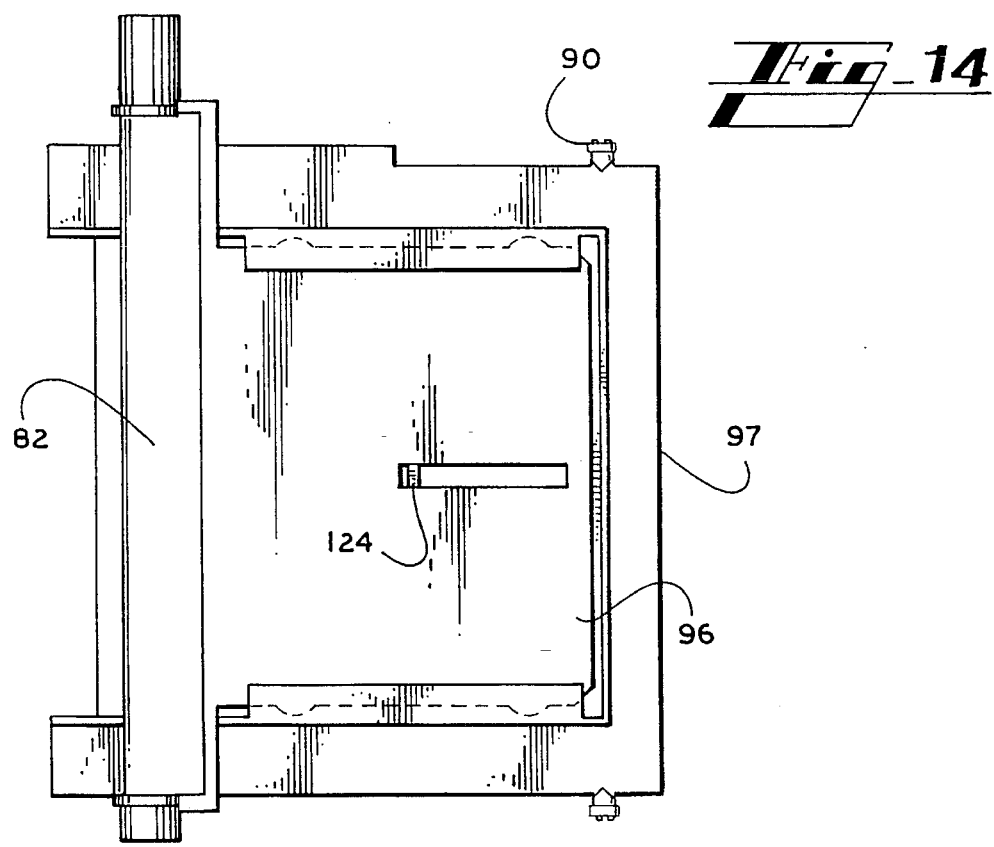
FIG. 14 is a bottom view of the door of FIG. 10 open showing door length retraction.

Referring to the embodiment of FIGS. 10–14, a door 72 controls air flow in a vehicle 74 wherein the vehicle 74 has a guide rail 76 and an air duct 78 with a duct opening 80. The door 72 controls the air flow through the air duct 78. Door 72 is movable between a closed position (FIG. 10) at which the door 72 restricts or completely blocks air flow to the duct 78 and an open position (not shown) at which the door 72 directs air flow through duct opening 80 into the duct 78 to varying degrees. In FIG. 10, the door 72 pivots to the left to the open position from the closed position shown. As viewed in FIGS. 10, 13 and 14, the bottom portion of the door is pivoted by a pivoting means 82, such as an electric motor. The top portion of the door 72 rides in an guide rail 76 that constrains movement of the top portion of the door to the shape of the guide rail, which, as illustrated, is two straight paths with a short curved path connecting a short straight path and a much longer straight path. To accomplish both pivotal movement of the lower portion of the door 72 and straight line movement of the upper portion of the door 72, the length of the door must change. Door length change is accomplished by having the door comprised of two slidably engaging panel members 96 and 97.

Referring to FIG. 11, each side of the top portion of the door 72 has a rail guide 84 that rides in guide rail 76. A rail guide 84 on the second panel 97 is positioned outboard of a first rail 116 and extends outwardly in a direction away from the first rail 116 and central slot 110. Another rail guide 84 on the second panel is positioned outboard of the second rail 118 and extends outwardly in a direction away from the second rail 118 and central slot 110. Rail guide 84 has a curved surface portion 86 and a groove 88 dividing the surface portion 86 into two segments. The two segments are urged towards one another to insert the guide 84 and released so that the curved surface 86 locks the guide in place in the guide rail for sliding contact. Under some circumstances, the guide 84 may be more desirable than the plain guide pins depicted in FIGS. 1–6. For example, where relative motion, other than the desired sliding motion, is not desired, the guide 84 is preferred for its ability to contract to enter the rail and then expand to fill the rail completely FIG. 12 illustrates a two-piece guide 90 with a split member 92 and a ring 94 providing a bearing surface that may roll or slide along the guide rail 76. Squeezing the two segments of the split member 92 together allows the bearing ring 94 to be installed. A two-piece guide may be preferable in some circumstances, such as where rolling contact is desired for smoother operation or where greater load carrying is needed.

Referring now to FIG. 15, the first panel 96 has a first end 98, first and second end portions 100, 102, a middle portion 104 intermediate the end portions 100, 102, and first and second side portions 106, 108. The first end 98 forms an end face on the first end portion 100 and represents the end of the panel farthest removed from the middle and second end portions 104, 102 of the first panel 96. Middle portion 104 defines a central slot 110 that extends between the first and second end portions 100, 102 and is a longitudinal slot oriented perpendicular to the first end 98 and parallel to the side portions 106, 108. The side portions have first and second protrusions 112, 114 that extend outward in a direction away from the central slot 110. Preferably, there are a plurality of first protrusions on the first side portion and a plurality of second protrusions on the second side portion. The protrusions enjoy sliding contact with the second panel 97 and minimize friction that would be encountered if the entire edge of the side portion contacted the second panel. Also, the protrusions provide contact with the protruding portions of the side rails without increasing the lateral dimension of the panel for assembly purposes.

Referring to FIGS. 16–17, the second panel 97 has first and second inverted L-shaped rails 116, 118 with slider portions 120, 122 respectively slidably engaging the first and second side portions 106, 108. Slider portions 120, 122 extend inward toward the central slot 110 beneath the side portions 106, 108 to cooperate with the side portions to connect the panels for sliding engagement. In each rail, the short leg of the L is preferably the protruding portion and the long leg of the L is the slider portion 120 or 122 to form a slot between the long leg of the L and the underside of the second panel 97 into which a side portion 106 or 108 of the first panel will fit to achieve sliding engagement and join the two panels.

The second panel 97 also includes stop member 124 that rides in the central slot 110 and engages a first end of the central slot 110 to prevent varying the length of the door beyond a predetermined extended length. Stop member 124, cooperating with slot 110, determines the maximum extended length of the door.

The first and second panels are assembled by aligning the first and second rails with their respective first and second side portions at the first end of the first panel. The second panel is pushed toward the first panel so that the protrusions on the side portions of the first panel slide into the slots provided by the rails. Continued pushing causes the stop member to enter into a forced passageway between the two panels and to find the central slot. The stop member may have a tapered portion to force open a passageway between the panels. When the stop member enters the slot, the first panel snaps back into position abutting the second panel. As viewed in FIG. 10, the rails prevent the panels from being separated horizontally and the stop member prevents the wings from being separated vertically.

Operation of the present invention is believed to be apparent from the foregoing description and drawings, but a few words will be added for emphasis. As the door moves from the closed, full cool, position (FIGS. 1 and 10) to the open, full heat, position (FIG. 2), the pivoting means pivots the first end portion of the first panel causing the first end portion of the second panel to pivot with the first panel. Because the guide rail constrains the second end of the second panel to travel in a fixed path, in this instance a straight or primarily straight line, the pivoting motion requires relative movement between the first and second panels. This relative movement is a sliding motion wherein the side rails slide along the side portions of the first panel and the wings slide along the middle portion adjacent the central slot in the embodiment of FIG. 1, or the rails slide along the protrusions on the side portions of the first panel in the embodiment of FIG. 10.

It can now be appreciated that there has been presented a door for an air duct of a vehicle for controlling air flow through the duct. The door is a simple two panel door with interlocking parts that allow relative sliding motion of the panels. By constraining the top portion of the second panel to travel in a straight line or other fixed, nonarcuated path, space is conserved in the ventilation system while effectively controlling air flow through the air duct. Pivoting of the first panel may be accomplished by an electric motor, thumb wheel, knob or other control.

While the invention has been described with particular reference to a vehicle ventilation system it is apparent that the pivoting, variable length, two panel door is easily adapted to other ventilation systems where space conservation is a concern. As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. An air duct door for controlling air flow through an air duct in a vehicle, comprising:

a first panel having a first end, first and second end portions, a middle portion intermediate said end portions defining a central slot extending between said end portions, first and second side portions respectively containing first and second side protrusions extending outwardly in a direction away from said central slot; and a second panel, overlaying said first panel, having first and second rails with first and second protruding portions respectively extending from said second panel and with first and second slider portions respectively extending laterally under said first panel from said first and second protruding portions toward said central slot and slidably engaging said first and second side portions, said panels being slidably movable one relative to the other to vary the length of said door.

2. An air duct door, as set forth in claim 1, wherein said first and second side protrusions of said first panel contact said protruding portions of said rails locking said first and second panels together.

3. An air duct door, as set forth in claim 1, including a stop member on said second panel riding in said central slot and engaging a first end of said slot to prevent varying the length of said door beyond a predetermined extended length.

4. An air duct door, as set forth in claim 1, wherein said vehicle has a guide rail and including:

a guide on said second panel constrained in said guide rail; and means for pivoting said second end portion of said first panel, said panels sliding relative to one another and varying the length of said door as said first panel pivots with a second end portion of said second panel moving with said first panel and a distal end of said second panel constrained by said guide and guide rail to move in a fixed path as said panels slide.

5. An air duct door, as set forth in claim 1, including:

a first rail guide on said second panel positioned outboard of said first rail and extending outwardly in a direction away from said first rail and central slot; and a second rail guide on said second panel positioned outboard of said second rail and extending outwardly in a direction away from said second rail and central slot.

6. An air duct door, as set forth in claim 5, wherein said first guide rail has a surface defining a groove dividing said rail guide into two segments that are urged towards one another for assembly and released to lock said rail guide in position.

7. An air duct door, as set forth in claim 5, wherein said first guide rail has a surface defining a groove dividing said rail guide into two segments that are urged towards one another to receive a bearing.

8. An air duct door for controlling air flow through an air duct in a vehicle, comprising:

a first panel having a first end, first and second end portions, a middle portion intermediate said end portions defining a central slot extending between said end portions, first and second side portions respectively defining first and second side slots extending from said first end to said second end portion parallel to said central slot and positioned one side slot on each side of said central slot separating said side portions and said middle portion; and a second panel, overlaying said first panel, having first and second rails with protruding portions respectively extending through said first and second side slots and with slider portions respectively slidably engaging said first and second side portions, and having a slide with a body and wings, said body riding in said central slot with said wings extending below said first panel laterally under said first panel beyond said central slot toward said rails locking said panels together, said panels being slidably movable one relative to the other to vary the length of said door.

9. An air duct door, as set forth in claim 8, wherein said slot is T-shaped with the cross member of the T formed in said first end portion providing an entryway for said wings of said slide.

10. An air duct door, as set forth in claim 8, including a stop member on said second panel riding in said central slot and engaging a first end of said slot to prevent varying the length of said door beyond a predetermined extended length.

11. An air duct door, as set forth in claim 8, wherein said slider portion of said first rail extends away from said central slot beneath said first side portion for sliding contact with said first side portion and cooperating to connect said first and second panels.

12. An air duct door, as set forth in claim 8, including a bracket connecting said first side portion to said middle portion and receiving said slider portion of said first rail therein.

13. An air duct door, as set forth in claim 8, including:

a first rail guide on said second panel positioned outboard of said first rail and extending outwardly in a direction away from said first rail and central slot; and a second rail guide on said second panel positioned outboard of said second rail and extending outwardly in a direction away from said second rail and central slot.

14. An air duct door, as set forth in claim 13, wherein said first guide rail has a surface defining a groove dividing said rail guide into two segments that are urged towards one another for assembly and released to lock said rail guide in position.

15. An air duct door, as set forth in claim 13, wherein said first guide rail has a surface defining a groove dividing said rail guide into two segments that are urged towards one another to receive a bearing.

16. A door for controlling air flow in a vehicle, said vehicle having a guide rail and an air duct with a duct opening, said door controlling air flow through said air duct, said door comprising:

a first panel having a first end, first and second end portions, a middle portion intermediate said end portions defining a central slot extending between said end portions, first and second side portions respectively defining first and second side slots extending from said first end to said second end portion parallel to said central slot and positioned one side slot on each side of said central slot separating said side portions and said middle portion, said first panel being pivotally movable between an open position at which said door is spaced from said duct opening allowing maximum air flow through said duct opening and a closed position at which said door overlays said duct opening allowing minimum air flow through said duct opening; and a second panel, overlaying said first panel, having first and second rails with protruding portions respectively extending through said first and second side slots and with slider portions respectively slidably engaging said first and second side portions, and having a slide with a body and wings and a guide constrained in said guide rail, said body riding in said slot with said wings extending below said first panel laterally under said first panel beyond said slot toward said rails locking said panels together, said panels being slidably movable one relative to the other to vary the length of said door as said guide rides said guide rail.

17. A door, as set forth in claim 16, including means for pivotally connecting said second end portion of said first panel, said panels sliding and varying the length of said door as said first panel pivots with a second end portion of said second panel moving with said first panel and a distal end of said second panel constrained by said guide and guide rail to move in a straight line path as said panels slide relative to one another.

18. An air duct door, as set forth in claim 16, wherein said slider portion of said first rail extends away from said central slot beneath said first side portion for sliding contact with said first side portion.

19. An air duct door, as set forth in claim 18, wherein said slider portion of said first rail extends away from said central slot beneath said first side portion for sliding contact with said first side portion and cooperating to connect said first and second panels.

20. An air duct door, as set forth in claim 16, including a bracket connecting said first side portion to said middle portion and receiving said slider portion of said first rail therein.

* * * * *